United States Patent
Yeh

(10) Patent No.: US 10,754,566 B2
(45) Date of Patent: Aug. 25, 2020

(54) DATA STORAGE DEVICE AND DATA STORAGE METHOD

(71) Applicant: Silicon Motion, Inc., Jhubei (TW)

(72) Inventor: Szu-I Yeh, New Taipei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 229 days.

(21) Appl. No.: 15/626,371

(22) Filed: Jun. 19, 2017

(65) Prior Publication Data

US 2018/0011637 A1 Jan. 11, 2018

(30) Foreign Application Priority Data

Jul. 5, 2016 (TW) .............................. 10 5121194 A

(51) Int. Cl.
*G06F 3/06* (2006.01)
*G06F 12/02* (2006.01)
*G06F 11/10* (2006.01)

(52) U.S. Cl.
CPC ............ *G06F 3/064* (2013.01); *G06F 3/0604* (2013.01); *G06F 3/0619* (2013.01); *G06F 3/0679* (2013.01); *G06F 11/1004* (2013.01); *G06F 11/1068* (2013.01); *G06F 12/0246* (2013.01); *G06F 2212/7201* (2013.01)

(58) Field of Classification Search
CPC .. G06F 3/064; G06F 12/0246; G06F 11/1068; G06F 11/1004; G06F 3/0679; G06F 3/0604; G06F 3/0619; G06F 2212/7201
USPC ......................................................... 714/807
See application file for complete search history.

(56) References Cited

U.S. PATENT DOCUMENTS

| 8,050,095 B2 | 11/2011 | Gonzalez et al. |
| 8,301,981 B2 | 10/2012 | Chu et al. |
| 8,612,836 B2 * | 12/2013 | Yoon .................... G06F 11/1068 365/185.09 |
| 8,681,554 B2 * | 3/2014 | Suzuki .................. G06F 3/0616 365/185.16 |
| 9,727,414 B2 * | 8/2017 | Cohen .................. G06F 11/1096 |
| 10,153,782 B2 * | 12/2018 | Cai ...................... G06F 11/1004 |
| 2005/0073884 A1 | 4/2005 | Gonzalez et al. |
| 2013/0051144 A1 | 2/2013 | Suzuki |
| 2013/0159815 A1 * | 6/2013 | Jung ........................ G06F 11/10 714/773 |
| 2015/0220387 A1 | 8/2015 | Kwok et al. |
| 2015/0301888 A1 | 10/2015 | Yang |

(Continued)

FOREIGN PATENT DOCUMENTS

| CN | 1882918 A | 12/2006 |
| CN | 101482837 A | 7/2009 |
| CN | CA 102157202 A | 8/2011 |

(Continued)

*Primary Examiner* — James C Kerveros
(74) *Attorney, Agent, or Firm* — McClure, Qualey & Rodack, LLP

(57) ABSTRACT

A data storage device utilized for storing a plurality of data includes a memory and a controller. The memory includes a plurality of blocks, and each of the blocks includes a plurality of physical pages. The controller is coupled to the memory. When the data storage device is initiated, or when the data size read by a host is greater than a threshold value, the controller inspects the status of the data stored by the physical pages of the memory.

15 Claims, 3 Drawing Sheets

(56) References Cited

U.S. PATENT DOCUMENTS

2016/0315635 A1* 10/2016 Cai .................... G06F 11/1004

FOREIGN PATENT DOCUMENTS

| CN | 105047224 A | 11/2015 |
| CN | 105706059 A | 6/2016 |
| TW | 200532695 A | 10/2005 |
| TW | 201037716 A | 10/2010 |

* cited by examiner

DATA STORAGE DEVICE AND DATA STORAGE METHOD

CROSS REFERENCE TO RELATED APPLICATIONS

This Application claims priority of Taiwan Patent Application No. 105121194 filed on Jul. 5, 2016, the entirety of which is incorporated by reference herein.

BACKGROUND OF THE INVENTION

Field of the Invention

The disclosure generally relates to a data storage device and a data storage method, and more particularly, to a data storage device and a data storage method which detect each of the stored data based on the logical pages.

Description of the Related Art

Regarding non-volatile data storage devices, users might use a host to frequently read data in a specific physical address. Because of this, the non-volatile data storage device may become damaged, and after a while, the data in the specific physical address cannot be read correctly. There are many methods for detecting data which is read frequently. However, the above methods do not detect data which has not been read for a long period of time. Whether or not there is an error or damage to data that has not been read for a long period of time cannot be confirmed. Therefore, an effective data storage device and a data storage method are needed in order to sequentially detect data stored in the memory.

BRIEF SUMMARY OF THE INVENTION

In order to solve the aforementioned problem, the invention proposes a data storage device and a data storage method to sequentially detect each of the data stored in the memory. When the data storage device is initiated or when the amount of data which is read by a host is greater than a predetermined value, the controller is utilized to detect the status of the data stored in the physical pages of the memory. Specifically, the controller detects the status of the data stored in the corresponding physical pages according to the sequence of the logical pages. Therefore, all data stored in the memory will be executed, including data which has not been read by the host for a long time. In addition, the data storage method of the present invention detects the status of a plurality of data stored in a plurality of physical pages of memory, when it determines that the data storage device is initiated or the amount of data read by the host is greater than a predetermined value. Therefore, data that has not been read for a long time can be detected without affecting the operation of the data storage device. At the same time, the reliability of the data storage device is improved, and the proper performance of the data storage device is maintained.

In one aspect of the invention, the present invention provides a data storage device utilized for storing a plurality of data. The data storage device includes a memory and a controller. The memory includes a plurality of blocks. Each of the blocks includes a plurality of physical pages. The controller is coupled to the memory. When the data storage device is initiated or when the amount of data which is read by a host is greater than a predetermined value, the controller is utilized to detect the status of the data stored in the physical pages of the memory. Specifically, the controller maps the logical pages to the physical pages of the memory, and detects the status of the data that is stored in the corresponding physical pages according to the sequence of the logical pages.

In one embodiment, the memory stores a variable to record the number of logical pages for the controller to execute the detection. The variable is increased after the controller detects the data stored in the corresponding physical pages of the memory according to the logical pages. The variable is reset after the controller has detected the data of all physical pages of the memory. In addition, the controller detects the ECC bit number of the data to determine whether there is an error in the data. When the controller determines that there is an error in the data, the controller moves the wrong data.

Furthermore, each logical page is divided into a plurality of areas, wherein the first area located on the front side of the logical page is utilized to store high-importance data, and the detection frequency for the first area is greater than the detection frequencies for other areas. The controller alternatively detects the first area and any of the other areas that are different from the first area until each of the areas is detected. In addition, the number of logical pages for the controller to initiate the data storage device is greater than the number of logical pages which is the predetermined value of the amount for the host to read data. The predetermined value is determined by performance deterioration caused by detecting the memory and determined by the reliability of the memory.

In another aspect of the invention, the present invention provides a data storage method utilized for a host and a data storage device for storing a plurality of data. The data storage device includes a memory and a controller. The data storage method includes determining whether the data storage device is initiated or not, and determining whether the amount of data which is read by the host is greater than a predetermined value or not; and when the data storage device is initiated or when the amount of data read by the host is greater than a predetermined value, the controller detects the status of the data stored in the physical pages of the memory.

BRIEF DESCRIPTION OF DRAWINGS

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

Figure 1:
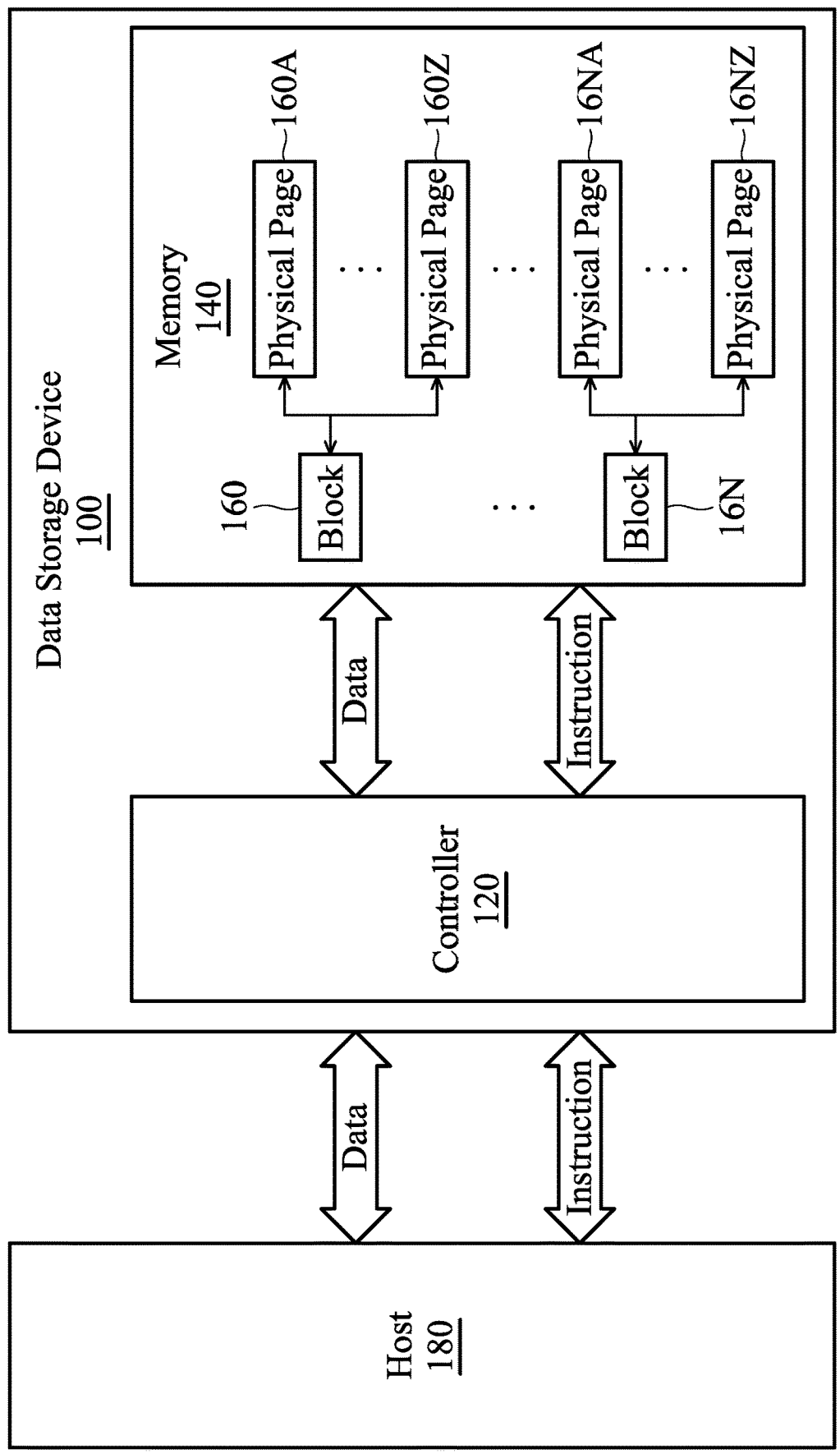
FIG. 1 is a schematic diagram of a data storage device and a host according to an embodiment of the invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a schematic diagram of a data storage device 100 and a host 180 according to an embodiment of the invention. In one embodiment, the data storage device 100 includes a controller 120 and a memory 140. The data storage device 100 is coupled to the host 180 to transmit data and instructions or receive data and instructions. The memory 140 could be non-volatile memory such as NAND flash. The host 180 could be a mobile phone, a tablet computer, a laptop computer, a navigation device or in-vehicle system.

As shown in FIG. 1, the memory 140 includes a plurality of blocks 160A-160N. Specifically, each of the blocks 160A-160N further includes a plurality of physical pages. The block 160 includes physical pages 160A-160Z, and the block 16N includes physical pages 16NA-16NZ. When the controller 120 performs a writing operation or a programming operation on the memory 140, it controls the memory 140 to perform the writing or programing operation with the unit of a physical page. The controller 120 performs a reading operation on the memory 140 by controlling the memory 140 with the unit of a cluster. In addition, the controller 120 is coupled to the memory 140 to transmit data and instructions or to receive data and instructions mutually. Furthermore, the controller 120 can be a read-only-memory (ROM) and a micro-controller with firmware code, and the micro-controller executes the firmware code to operate or access the memory 140.

Regarding the memory 140, each of the physical pages 160A-16NZ has a different physical address. In other words, each of the physical pages 160A-16NZ has a physical address, and each physical address of the physical pages 160A-16NZ is different. When a writing operation is executed by the data storage device 100, the controller 120 determines the physical address of the memory 140 for writing or storing data. In addition, the physical addresses are mapped to a plurality of respective logical addresses by the controller 120. Therefore, for the host 180, the host 180 reads or writes data which is stored in a logical address by the data storage device 100 through the logical address.

In one embodiment, the controller 120 maps the logical pages to the physical pages of the memory 140 and inspects the status of the data stored in the corresponding physical pages of the memory according to the sequence of the logical pages. Specifically, the controller 120 inspects the ECC bit number of the data to determine whether there is an error or not. When the ECC bit number is low, the controller 120 determines that the data is correct, and there is no error. When the ECC bit number is high, the controller 120 determines that there is an error in the data. For example, when the ECC bit number is lower than 40 bits, the data is determined to be correct. When the ECC bit number is greater than 40 bits, the data is determined to be wrong. It should be noted that the inspection is executed by the controller 120 according to the sequence of logical pages. Therefore, no matter whether the data stored in the physical pages corresponding to the logical pages is read frequently or not, the inspection can be executed without missing any data. By utilizing the data storage device 100 of the present invention, the data which has not been read for a long period of time may be inspected to determine whether or not it is stored in the memory 140 correctly.

When the controller 120 determines there is an error, the controller 120 will move the error data. For example, the above error data is originally stored in physical page 160A, and the controller 120 moves the data from physical page 160A to physical page 160Z. In another embodiment, each one of the physical pages 160A-16NZ could be divided into a plurality of areas. For example, the error data is stored in the first area of physical page 160A, and the controller 120 moves the data from the first area of physical page 160A to the second area of physical page 160A, which is different from the first area.

In another embodiment, when the data storage device 100 is initiated, or when the data read by the host 180 is more than a predetermined value, the controller 120 inspects the status of the data stored in the physical pages of the memory 140. The controller 120 maps the logical pages to the physical pages of the memory 140, and it inspects the status of the data stored in the corresponding physical pages of the memory 140 according to the sequence of the logical pages. Although there is a time limit for initiating the data storage device 100, the period for build-link is usually shorter than the time limit for initiating the device. Accordingly, the time gap between them could be utilized for the controller 120 to inspect the status of the physical pages of the memory 140.

In addition, when the amount of data read by the host 180 is greater than a predetermined value, the break time of reading data could be utilized for the controller 120 to detect the status of data in the physical pages of the memory 140. It should be noted that the above predetermined value is determined by the performance deterioration caused by inspecting the memory 140 and determined by the reliability of the memory 140. For example, the host 180 inspects eight logical pages after it reads data of 1 MB (which means the predetermined value is 1 MB), and it results in performance deterioration of about 3%. The host 180 inspects eight logical pages after it reads data of 10 MB (which means the predetermined value is 10 MB), and it results in performance deterioration of about 0.3%. As such, the predetermined value is proportional to the allowable performance deterioration. Furthermore, the reliability of the memory 140 is related to the surrounding environment and the type of memory 140. When the memory 140 has high reliability, the possibility for errors to develop in the stored data is low. Therefore, the predetermined value could be increased to reduce the frequency for the controller 120 to inspect data of the memory 140. As illustrated above, the predetermined value is inversely proportional to the reliability of the memory 140.

In one embodiment, the memory 140 stores a variable to record the number of logical pages which are used for inspection by the controller 120. After the controller 120 inspects data stored in the corresponding physical pages of the memory 140 according to the logical pages, the variable is increased. The controller 120 performs the inspection one by one based on the sequence of logical pages. By utilizing the variable, which logical page has been inspected or how many logical pages have been inspected could be recorded. When the controller 120 inspects data stored in the corresponding physical pages according to the logical pages and confirms that the data is accurate, the variable is increased. Afterwards, the inspection is executed for the next logical page. When the controller 120 inspects that the data is wrong, the data is moved to reduce the risk of error. Afterwards, the variable is decreased, and the inspection is executed for the next logical page.

Accordingly, since the controller 120 inspects the data of the memory 140 sequentially according to the sequence of the logical pages, the value of the variable keeps increasing. When the controller 120 has inspected all of the data stored in the physical pages of the memory 140, the variable will be reset to zero by the controller 120 to indicate that the inspection is finished. Afterwards, the data stored in the memory 140 will be sequentially inspected again according to the sequence of the logical pages. By utilizing the variable of the present invention, it could be confirmed that the controller 120 detects each of the data of the memory 140 according to the sequence of the logical pages without missing any data. Data that has not been read for a long period of time can be inspected effectively.

Figure 2:
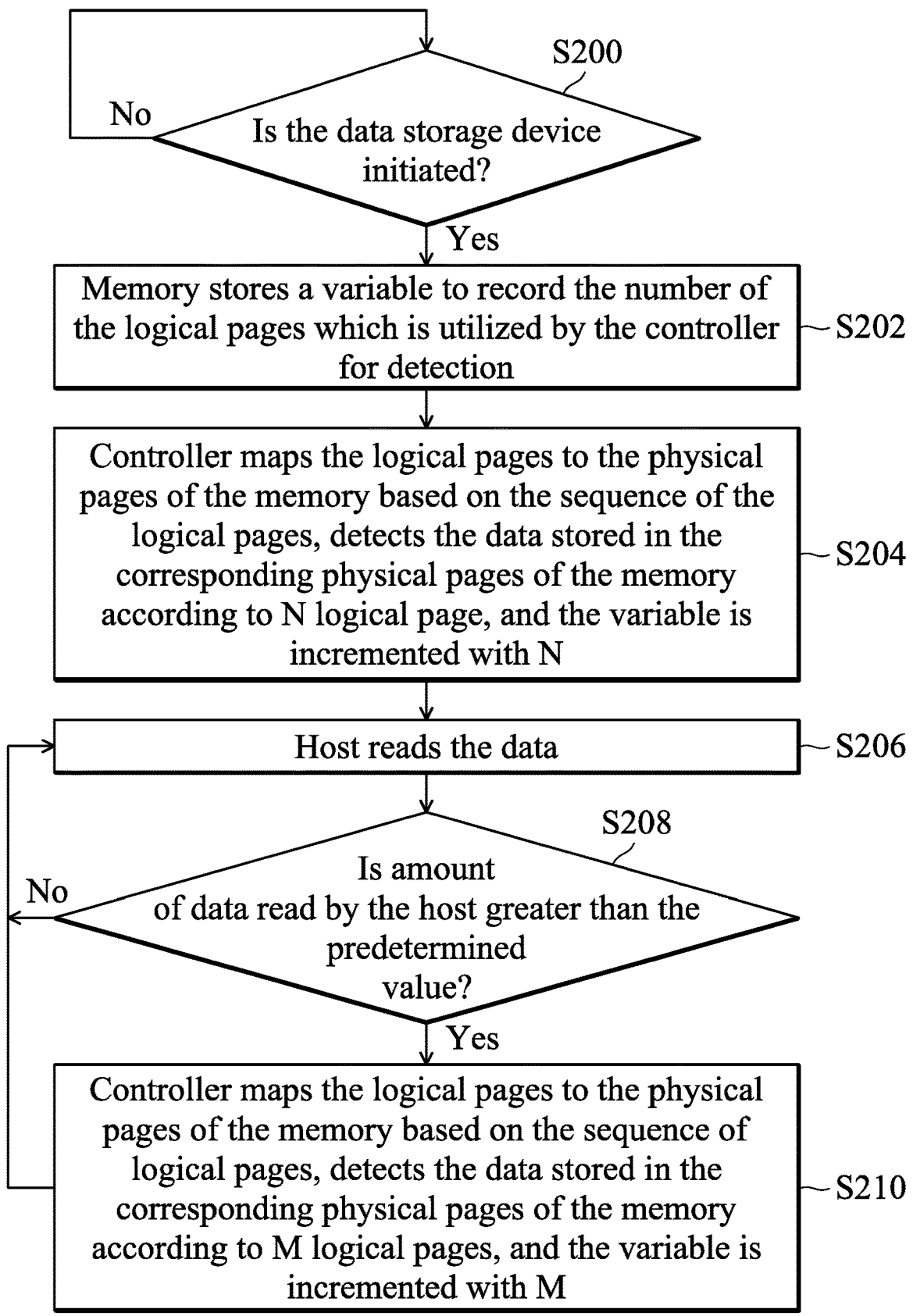
FIG. 2 is a flowchart of a data storage method according to an embodiment of the invention.

FIG. 2 is a flowchart of a data storage method according to an embodiment of the invention. In step S200, the controller 120 determines whether to initiate the data storage device 100 or not. If the data storage device 100 is not initiated, step S200 is executed again. If the data storage device 100 is initiated, step S202 will be executed. In step S202, the memory 140 stores a variable to record the number of logical pages which is utilized by the controller 120 to detect the data of memory 140. Afterwards, in step S204, the controller 120 maps the logical pages to the physical pages of the memory 140 based on the sequence of the logical pages, and it inspects the data stored in the corresponding physical pages of the memory 140 according to N logical pages. Afterwards, the variable is increased by the value of N. It should be noted that the value N is determined by the time limit of the data storage device 100 and the gap of build-link. When the time gap becomes larger, the N value becomes larger, which means that the controller 120 could detect the data of memory 140 based on more logical pages.

Afterwards, in step S206, the host 180 reads the data stored in the memory 140. In step S208, the controller 120 determines whether the amount of data read by the host 180 is greater than the predetermined value. The definition of the predetermined value has been provided, and will not be repeated again. When the controller 120 determines that the amount of data read by the host 180 is not greater than the predetermined value, step S206 will be executed. When the controller 120 determines that the amount of data read by the host 180 is greater than the predetermined value, step S210 will be executed. In step S210, the controller 120 maps the logical pages to the physical pages of the memory 140 based on the sequence of the logical pages, and it detects the data stored in the corresponding physical pages of the memory 140 according to M logical pages. The variable is increased by the value of M. In order to prevent the performance of the data storage device 100 from degrading and affecting user experience, the M value is usually smaller than the N value. In other words, the number of logical pages utilized for the controller 120 to initiate the data storage device 100 (N value) is greater than the number of logical pages which is the predetermined value of the amount for the host 180 to read data (M value).

Figure 3:
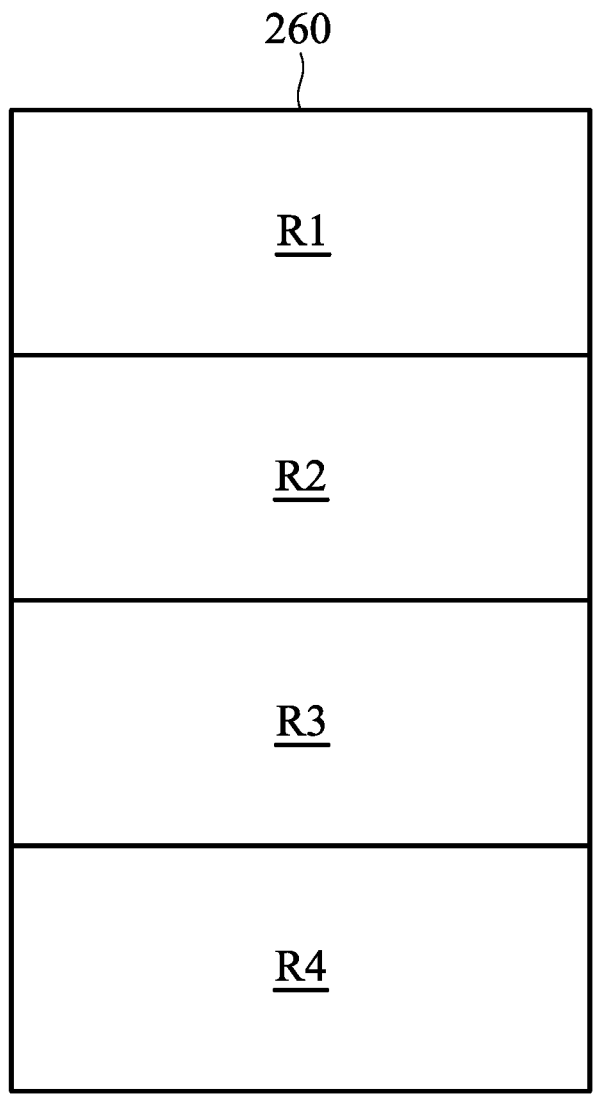
FIG. 3 is a schematic diagram illustrating the logical page according to an embodiment of the invention.

FIG. 3 is a schematic diagram illustrating the logical page 260 according to an embodiment of the invention. In one embodiment, the logical page 260 is divided into a plurality of areas. As illustrated in FIG.3, the logical page 260 is divided into a first area R1, a second area R2, a third area R3, and a fourth area R4. The data stored in the memory 140 could have different levels of importance. Therefore, the first area R1 located in the front side of the logical page 260 is utilized to store data of high importance, such as system data or initiating data. It should be noted that the frequency for detecting the first area R1 is greater than the frequency for detecting other areas. Therefore, the safety and accuracy of high-importance data could be confirmed.

In one embodiment, the controller 120 alternatively detects the first area R1 and other areas that are different from the first area R1 (such as the second area R2, the third area R3, and the fourth area R4) until all areas have been detected. In other words, the controller 120 detects data of the physical pages corresponding to the first area R1, then detects data of the physical pages corresponding to the second area R2, then detects data of the physical pages corresponding to the first area R1 again, detects data of the physical pages corresponding to the third area R3, then detects data of the physical pages corresponding to the first area R1 again, then detects data of the physical pages corresponding to the fourth area R4. Compared with the detection method of detecting the first area R1, the second area R2, the third area R3 and the fourth area R4 sequentially, by utilizing the above alternative detection method, the detection frequency of the first area R1 is greater than the detection frequency of other areas. Therefore, the protection for the important data of the memory 140 can be improved.

The present invention provides a data storage device and a data storage method to sequentially detect data stored in the memory. The data storage device of the invention executes sequential detection based on the sequence of the logical pages. As such, no matter whether the data stored in the physical pages corresponding to logical pages is read frequently or not, it could be detected without missing any data. By utilizing the data storage device 100 of the present invention, data that has not been read for a long period of time can be detected, and whether or not it is stored in the memory 140 accurately can be further confirmed.

In addition, the data storage method of the present invention detects the status of a plurality of data stored in a plurality of physical pages of the memory, when it determines that the data storage device is initiated or the amount of data read by the host is greater than a predetermined value. In other words, the data storage method of the present invention utilizes the small amount of spare time of the operation of the data storage device 100 to perform the detection. Therefore, the effect on the performance could be reduced, and user experience will not be affected. Furthermore, by utilizing the variable of the invention for recording, the controller 120 could detect data of the memory 140 one by one based on the sequence of the logical pages and avoid missing any data. Accordingly, data that has not been read for a long time can be detected effectively.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name to distinguish the claim elements. While the invention has been described by way of example and in terms of the preferred embodiments, it is to be understood that the invention is not limited to the disclosed embodiments. On the contrary, it is intended to cover various modifications and similar arrangements. Therefore, the scope of the appended claims should be accorded the broadest interpretation so as to encompass all such modifications and similar arrangements.

What is claimed is:

1. A data storage device, comprising:
   a memory, comprising a plurality of blocks, wherein each of the blocks comprises a plurality of physical pages, and the physical pages store data of a plurality of logical pages; and
   a controller, coupled to the memory, configured to map the logical pages to the physical pages of the memory,
   wherein whenever a host reads an amount of data from the physical pages of the memory, the controller is configured to detect an error status of the data stored in each physical page corresponding to each logical page of a first predetermined number of logical pages among the plurality of logical pages in sequential order,
   wherein the error status indicates whether a number of error-check code (ECC) error bits of the data stored in each of the physical pages that correspond to the selected logical pages exceed a predetermined threshold,
   wherein the logical pages are divided into a plurality of areas, wherein a first area located on a front side of the logical pages stores system data or initiating data,
   wherein detection frequency for the first area is greater than detection frequencies for other areas.

2. The data storage device as claimed in claim 1, wherein the memory stores a variable to record the number of logical pages for the controller to execute the detection.

3. The data storage device as claimed in claim 2, wherein the variable is increased after the controller detects the data stored in the corresponding physical pages of the memory according to the logical pages.

4. The data storage device as claimed in claim 2, wherein the variable is reset after the controller has detected data of all physical pages of the memory.

5. The data storage device as claimed in claim 1, wherein the controller detects a number of ECC error bits of the data in the physical page corresponding to each selected logical page to determine whether there is an error in the data.

6. The data storage device as claimed in claim 5, wherein when the controller determines that there is an error in the data, the controller moves the wrong data.

7. The data storage device as claimed in claim 1, wherein the predetermined value is determined by performance deterioration caused by detecting the memory and determined by reliability of the memory.

8. The data storage device as claimed in claim 1, wherein the controller alternatively detects the first area and any of the other areas that are different from the first area until each of the areas is detected.

9. The data storage device as claimed in claim 1, wherein when the data storage device is initialized by the controller before the host starts reading data from the memory, the controller detects the error status of the data stored in each of the physical pages corresponding to each logical page of a second predetermined number of logical pages among the plurality of logical pages in sequential order,
   wherein the second predetermined number is greater than the first predetermined number.

10. The data storage device as claimed in claim 9, wherein the second predetermined number is determined by a time tap between a time limit for initializing the data storage device and a period for building links between the logical pages and the physical pages.

11. A data storage method, for use in a data storage device for storing a plurality of data, wherein the data storage device comprising a memory and a controller, and the memory comprises a plurality of blocks, and each block comprises a plurality of physical pages, and the physical pages store data of a plurality of logical pages, the data storage method comprising:
    mapping the logical pages to the physical pages of the memory; and
    whenever an amount of data is read from the physical pages by a host, detecting an error status of the data stored in each of the physical pages corresponding to each selected logical page of a first predetermined number of logical pages among the plurality of logical pages in sequential order,
    wherein the error status indicates whether a number of error-check code (ECC) error bits of the data stored in each of the physical pages that correspond to the selected logical pages exceed a predetermined threshold,
    wherein the logical pages are divided into a plurality of areas, wherein a first area located on a front side of the logical pages stores system data or initiating data,
    wherein detection frequency for the first area is greater than detection frequencies for other areas.

12. The data storage method as claimed in claim 11, further comprising storing a variable to record the number of logical pages for the controller to execute the detection.

13. The data storage method as claimed in claim 11, further comprising: detecting a number of ECC error bits of the data in the physical page corresponding to each selected logical page to determine whether there is an error in the data, and moving the wrong data when it is determined that there is an error in the data.

14. The data storage method as claimed in claim 11, further comprising:
    when the data storage device is initialized by the controller before the host starts reading data from the memory, detecting the error status of the data stored in each of the physical pages corresponding to each selected logical page of a second predetermined number of logical pages among the plurality of logical pages in sequential order,
    wherein the second predetermined number is greater than the first predetermined number.

15. The data storage device as claimed in claim 14, wherein the second predetermined number is determined by a time tap between a time limit for initializing the data storage device and a period for building links between the logical pages and the physical pages.

* * * * *